US009825805B2

(12) United States Patent
Mahapatra

(10) Patent No.: US 9,825,805 B2
(45) Date of Patent: Nov. 21, 2017

(54) MULTI-HOMING INTERNET SERVICE PROVIDER SWITCHOVER SYSTEM

(71) Applicant: Dell Products L.P., Round Rock, TX (US)

(72) Inventor: Sumanta Das Gajendra Mahapatra, West Bengal (IN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 15/047,360

(22) Filed: Feb. 18, 2016

(65) Prior Publication Data
US 2017/0244592 A1 Aug. 24, 2017

(51) Int. Cl.
*H04L 12/28* (2006.01)
*H04L 12/24* (2006.01)
*H04L 12/805* (2013.01)

(52) U.S. Cl.
CPC ...... *H04L 41/0654* (2013.01); *H04L 41/0659* (2013.01); *H04L 47/36* (2013.01)

(58) Field of Classification Search
CPC . H04L 41/0654; H04L 41/0659; H04L 41/06; H04L 47/10; H04L 47/36; H04L 47/365; H04L 29/1208; H04L 29/12933; H04L 29/12952; H04L 61/6059; H04L 61/6077; H04L 45/22; H04L 45/28
USPC .................................. 370/248, 221, 252, 400
See application file for complete search history.

(56) References Cited

U.S. PATENT DOCUMENTS

| | | | | |
|---|---|---|---|---|
| 7,920,481 B2* | 4/2011 | Winter | ................ | H04L 45/00 370/248 |
| 8,121,135 B2* | 2/2012 | Thathapudi | ............ | H04L 47/10 370/252 |
| 2004/0111529 A1* | 6/2004 | Parmar | ................ | H04L 29/06 709/245 |
| 2005/0041635 A1* | 2/2005 | Chung | ................ | H04L 47/10 370/351 |
| 2005/0281288 A1* | 12/2005 | Banerjee | ............... | H04L 47/10 370/477 |

(Continued)

OTHER PUBLICATIONS

"IPv6 Multihoming Without Network Address Translation, RFC 7157", Feb. 11, 2016, pp. 1-14, IETF Datatracker, Version 6.14.1, https://datatracker.ietf.org/doc/rfc7157/?include_text=1.

*Primary Examiner* — Afsar M Qureshi
(74) *Attorney, Agent, or Firm* — Haynes and Boone, LLP

(57) ABSTRACT

A multi-homing Internet service provider switchover system includes a plurality of Internet service provider systems and a respective router device coupled to each Internet service provider system. Each router device is configured to determine that a route to its respective Internet service provider system is unavailable and, in response, advertise as a non-default router device with router lifetime information and lifetime information for an address of its respective Internet service provider system set to zero. A client device receives a router advertisement from a first router device that was selected as a default router device, and determines that it includes lifetime information for an address of its first Internet service provider system set to zero. In response, the client device selects a second router device as the default router device such that traffic is switched from the first router device to the second router device.

20 Claims, 15 Drawing Sheets

(56) References Cited

U.S. PATENT DOCUMENTS

2013/0232275 A1\* 9/2013 Beres ............... H04L 29/12066
  709/228
2017/0093611 A1\* 3/2017 Arora ................. H04L 41/0654

\* cited by examiner

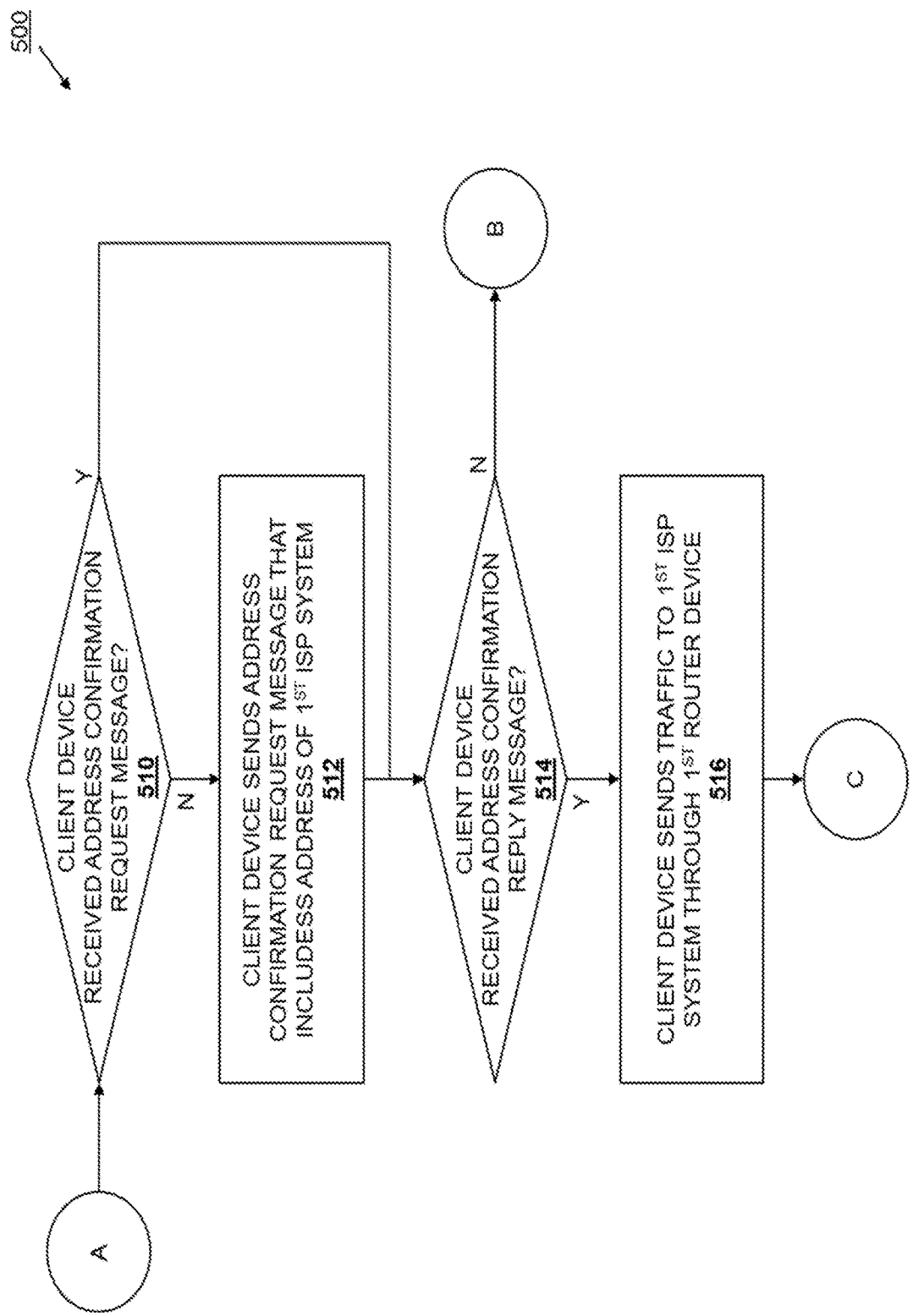

| TYPE 1102 | CODE | CHECKSUM |
|---|---|---|
| TARGET PREFIX LENGTH | | |
| TARGET PREFIX 1104 | | |
| ROUTER LIFETIME | | |

| TYPE 1302 | CODE | CHECKSUM |
| | TARGET PREFIX LENGTH | |
| TARGET PREFIX 1304 | | |

MULTI-HOMING INTERNET SERVICE PROVIDER SWITCHOVER SYSTEM

BACKGROUND

The present disclosure relates generally to information handling systems, and more particularly to an Internet service provider switchover system for multi-homed information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many situations, information handling systems such as, for example, client devices, may be connected to more than one computer network in a configuration that is referred to as "multi-homing". Such configurations may be provided in order to, for example, increase the reliability of an Internet Protocol (IP) network when client devices are served by more than one Internet service provider. For example, in networked systems that communicate using the Internet Protocol version 6 (IPv6), client devices may select and use a default router device from a plurality of router devices in order to communicate through the Internet using one or more remote systems. The selection of the default router device from the plurality of router devices is made in response to router advertisements from the plurality of router devices. However, when a link between a default router device (i.e., that is currently selected as a default router device by a client device) and an Internet service provider goes down, the use of IPv6 communications can result in lost traffic. For example, in many situations, the client device will not be able to switch existing traffic from its currently selected default router device (that can no longer communicate with its Internet service provider due to the down link) to other router device(s) connected to Internet service provider(s) that are available.

Such issues typically result from IPv6 router advertisement standards that cause the default router device (which is connected to the Internet service provider by the down link) to continue to send router advertisements that declare itself as the default router device, along with the address prefix for Internet service provider. As such, the client devices connected to that default router device continue to refresh their default router lifetime information and Internet service provider address lifetime information that may be provided by the Internet service provider. Conventional solutions to these issues that utilize neighbor detection do not operate to detect the unavailable Internet service provider issue because the default router device link-local address will still be reachable by the client devices. As such, traffic continues to be sent by the client devices to the default router device, and ends up being dropped due to the down link between the default router device and the Internet service provider.

Accordingly, it would be desirable to provide a multi-homing Internet service provider switchover system.

SUMMARY

According to one embodiment, an information handling system (IHS) includes a communication system that is configured to couple to a plurality of router devices that are each coupled to a respective Internet service provider system; a processing system that is coupled to the communication system; and a memory system that is coupled to the processing system and that includes instructions that, when executed by the processing system, cause the processing system to provide a default router determination engine that is configured to: send, through the communication system, traffic to a first Internet service provider system through to a first router device of the plurality of router devices that is selected as a default router device; and receive, through the communication system from the first router device in response to the first Internet service provider system becoming unavailable to the first router device, a second router advertisement that includes router lifetime information and lifetime information associated with an address of the first Internet service provider system set to zero and, in response, select a second router device of the plurality of router devices that is different than the first router device as the default router device such that the traffic is sent to a second Internet service provider system through the second router device.

BRIEF DESCRIPTION OF THE DRAWINGS

FIG. 5B is a flow chart illustrating an embodiment of a portion of a method for Internet service provider switchover in a multi-homing system

FIG. 11 is a schematic view illustrating an embodiment of an address confirmation request message used in the communications of FIG. 10.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
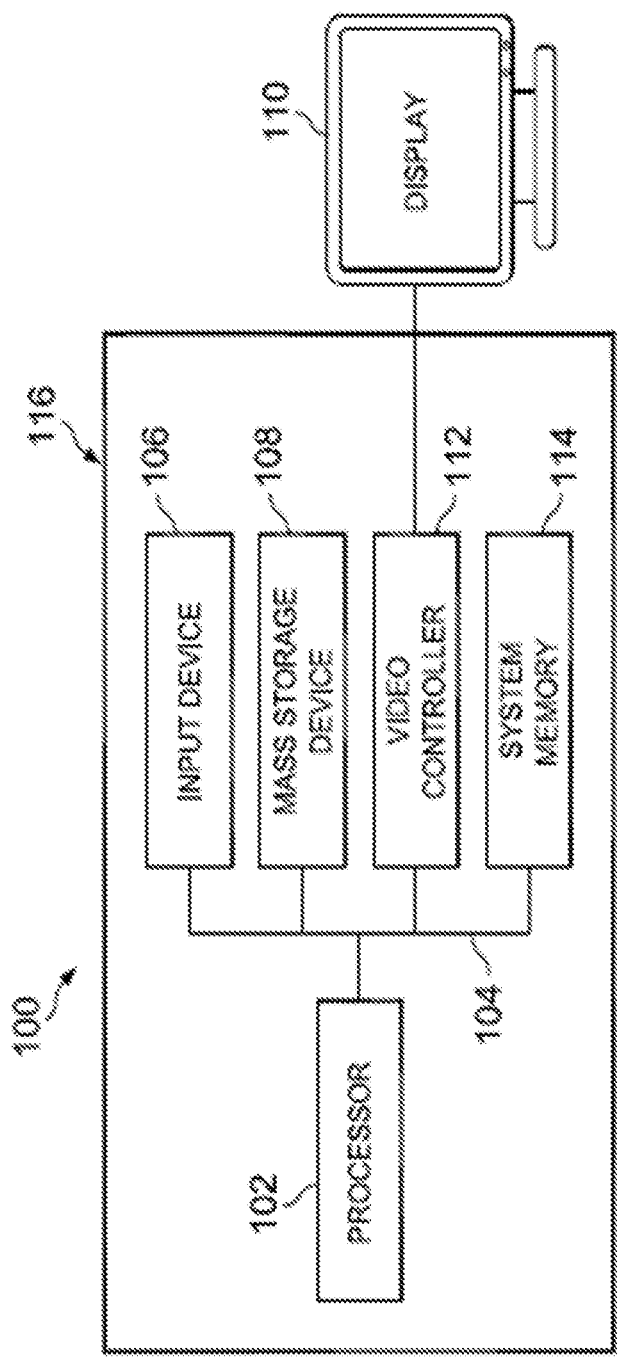
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
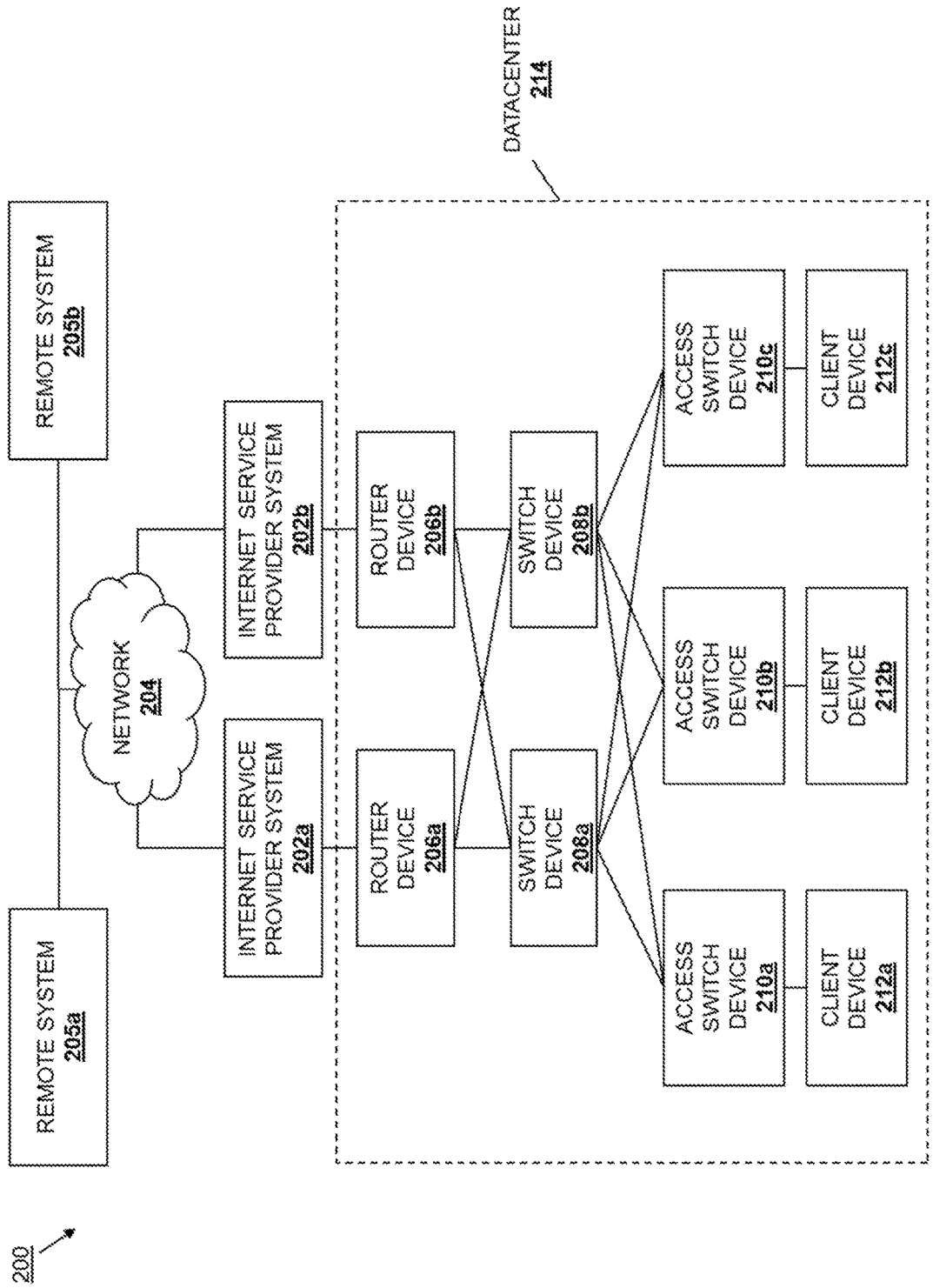
FIG. 2 is a schematic view illustrating an embodiment of a multi-homing Internet service provider switchover system.

Referring now to FIG. 2, an embodiment of a multi-homing Internet service provider (ISP) switchover system 200 is illustrated. In the illustrated embodiment, the multi-homing ISP switchover system 200 includes a plurality of Internet Service Provider systems 202a and 202b that are coupled to a network 204 such as, for example, the Internet. Either or both of the ISP systems 202a and 202b may be the IHS 100 discussed above with reference to FIG. 1 and/or may include some or all of the components of the IHS 100. While only two ISP systems 202a and 202b are illustrated, any number of ISP systems are envisioned as falling within the scope of the present disclosure. A plurality of remote systems 205a and 205b are also coupled to the network 204, and may be any systems reachable by the client devices discussed below through the network 204. For example, either or both of the remote systems 205a and 205b may be the IHS 100 discussed above with reference to FIG. 1 and/or may include some or all of the components of the IHS 100. While only two remote systems 205a and 205b are illustrated, any number of remote systems are envisioned as falling within the scope of the present disclosure. The ISP systems 202a and 202b are each coupled to a respective router device 206a and 206b. Either or both of the router devices 206a and 206b may be the IHS 100 discussed above with reference to FIG. 1 and/or may include some or all of the components of the IHS 100. In specific embodiments, the router devices 206a and 206b are exit router devices positioned at the edge/exit of a network. In an embodiment, the ISP systems 202a and 202b, the router devices 206a and 206b, and the network 204 may include high-speed, highly redundant forwarding services that move traffic between different layers in a networked system to provide various network services to users that are connected to the networked system, as well as including other subsystems to provide other functionality known the art.

The multi-homing ISP switchover system 200 also includes a plurality of switch devices 208a and 208b (which each are directly coupled to each of the router devices 206a and 206b) that each may be the IHS 100 discussed above with reference to FIG. 1 and/or may include some or all of the components of the IHS 100. In an embodiment, the switch devices 208a and 208b may provide for routing, filtering, and quality of service policies, as well as including other subsystems to provide other functionality known the art. The multi-homing ISP switchover system 200 also includes a plurality of access switch devices 210a, 210b, and 210c (which each are directly coupled to each of the switch devices 208a and 208b) that each may be the IHS 100 discussed above with reference to FIG. 1 and/or may include some or all of the components of the IHS 100. A client device 210a is coupled to the access switch device 210a, a client device 212b is coupled to the access switch device 210b, a client device 212c is coupled to the access switch device 210c, and each of the client devices 210a-c may be the IHS 100 discussed above with reference to FIG. 1 and/or may include some or all of the components of the IHS 100.

As is known in the art, the access switch devices 210a-c and the client devices 210a-c may include end stations and servers accessing services in the networked system, as well as including other subsystems to provide other functionality known the art. In the illustrated embodiment, the router devices 206a and 206b, the switch devices 208a and 208b, the access switch devices 210a, 210b, and 210b, and the client devices 210a, 212b, and 212c, are provided in a datacenter 214. While a specific embodiment of the multi-homing ISP switchover system 200 system 200 is illustrated and described herein (e.g., the specific components in the datacenter coupled to the ISP systems 202a and 202b), one of skill in the art in possession of the present disclosure will recognize that the teachings provided herein may be beneficial to a variety of other switchover system 200 systems known in the art. As such, different devices and systems may be utilized in place of those illustrated and provided in different configurations while remaining within the scope of the present disclosure.

Figure 3:
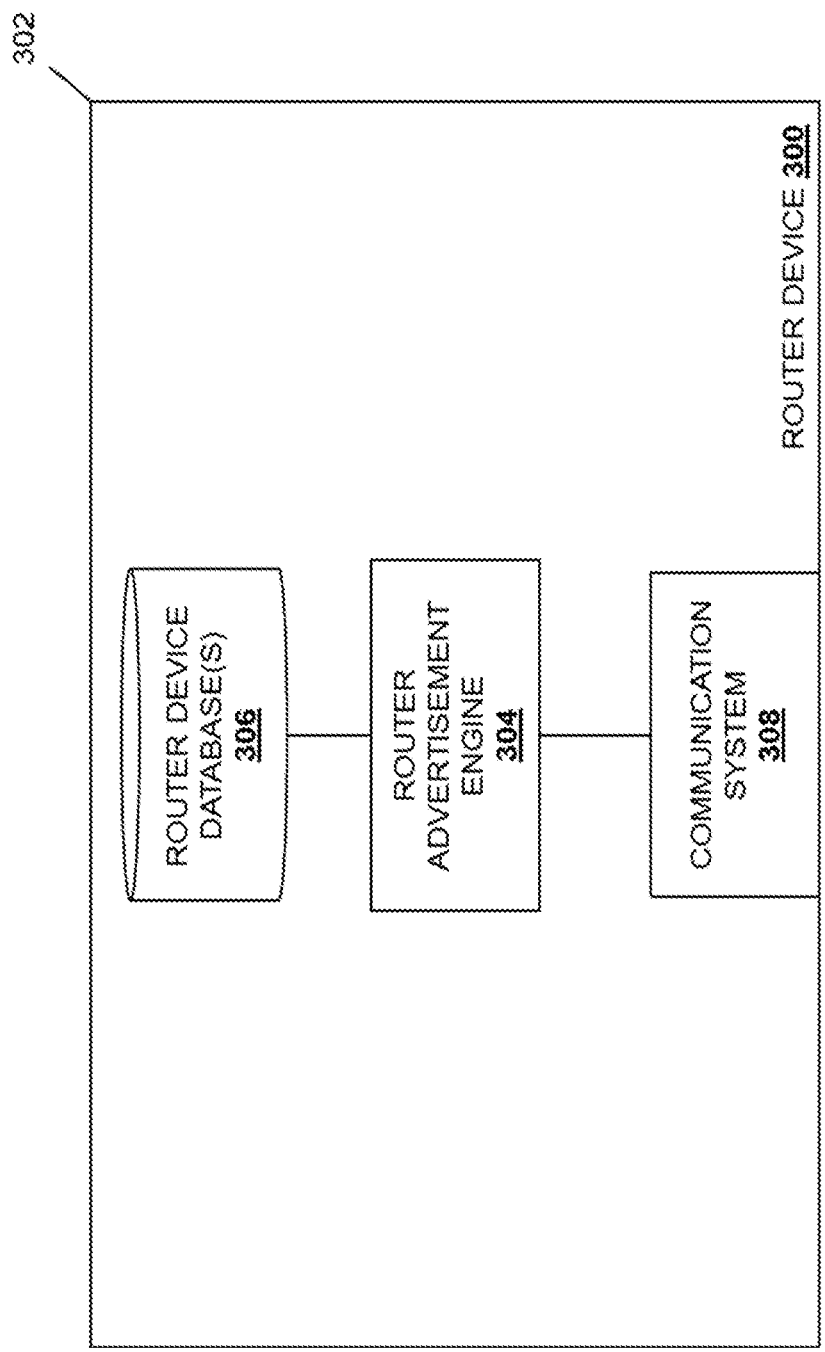
FIG. 3 is a schematic view illustrating an embodiment of a router device used on the multi-homing Internet service provider switchover system of FIG. 2.

Referring now to FIG. 3, an embodiment of a router device 300 is illustrated. In an embodiment, the router device 300 may be either or both of the router devices 206a and 206b discussed above with reference to FIG. 2. As such, the router device 300 may be the IHS 100 discussed above with reference to FIG. 1 and/or may include some or all of the components of the IHS 100. The router device 300 includes a chassis 302 that houses the components of the router device 300, only some of which are illustrated for clarity. One of skill in the art in possession of the present disclosure will recognize that the router device 300 may include a variety of router device components that provide for conventional router device functionality while remaining within the scope of the present disclosure. In the illustrated embodiment, the chassis 302 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a router advertisement engine 304 that is configured to perform the functions of the router advertisement engines and router devices discussed below.

The chassis 302 may also house a storage system (not illustrated, but which may include the storage device 108 discussed above with reference to FIG. 1) that includes one or more router device databases 306 that are coupled to the router advertisement engine 304 (e.g., via a coupling between the processing system and the storage system). The router device database(s) 306 may include one or more data structures that may be used by the router advertisement engine 304 to route data traffic from the client devices to the ISP systems discussed above, provide router advertisements as discussed below, and/or perform any of the other functionality detailed below. While illustrated as housed in the chassis 302, the router device database(s) 306 may be external to the chassis 302 and coupled to the router advertisement engine 304 via a network or other connection while remaining within the scope of the present disclosure. The router advertisement engine 304 is also coupled to a communication system 308 (e.g., via a coupling between the processing system and the communication system 308) that is housed in the chassis 302 and that may include a Network Interface Controller (NIC), a wireless communication device, and/or other communication components known in the art that enable the router device 300 to be coupled to Internet Service Provider systems (e.g., the Internet Service Provider systems 202a and 202b in FIG. 2), switch devices (e.g., the switch devices 208a and 208b in FIG. 2), and/or other network components known in the art. While a specific router device 300 has been illustrated, one of skill in the art in possession of the present disclosure will recognize that other router devices and/or networking equipment may benefit from the teachings of the present disclosure, and thus the application of those teachings to such systems will fall within the scope of the present disclosure.

Figure 4:
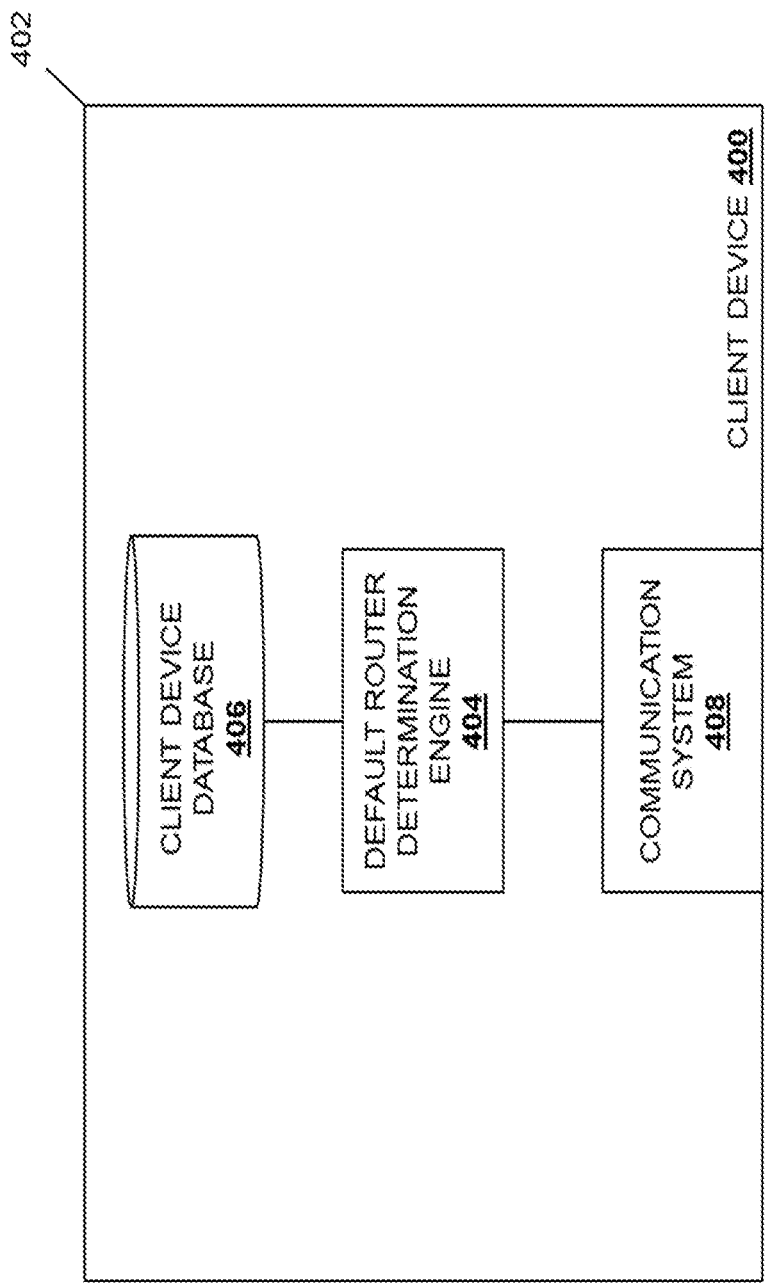
FIG. 4 is a schematic view illustrating an embodiment of a client device used on the multi-homing Internet service provider switchover system of FIG. 2.

Referring now to FIG. 4, an embodiment of a client device 400 is illustrated. In an embodiment, the client device 400 may be any or all of the client devices 210a, 212b, and 212c discussed above with reference to FIG. 2. As such, the client device 400 may be the IHS 100 discussed above with reference to FIG. 1 and/or may include some or all of the components of the IHS 100. The client device 400 includes a chassis 402 that houses the components of the client device 400, only some of which are illustrated for clarity. One of skill in the art in possession of the present disclosure will recognize that the client device 400 may include a variety of client device components that provide for conventional client device functionality while remaining within the scope of the present disclosure. In the illustrated embodiment, the chassis 402 houses a processing system (not illustrated, but which may include the processor 102 discussed above with reference to FIG. 1) and a memory system (not illustrated, but which may include the system memory 114 discussed above with reference to FIG. 1) that includes instruction that, when executed by the processing system, cause the processing system to provide a default router determination engine 404 that is configured to perform the functions of the default router determination engines and client devices discussed below.

The chassis 402 may also house a storage system (not illustrated, but which may include the storage device 108 discussed above with reference to FIG. 1) that includes one or more client device databases 406 that are coupled to the default router determination engine 404 (e.g., via a coupling between the processing system and the storage system). The router device database(s) 406 may include one or more data structures that may be used by the default router determination engine 404 to send and receive traffic, make default router determinations, and/or perform any of the other functionality discussed below. While illustrated as housed in the chassis 402, the client device database(s) 406 may be external to the chassis 402 and coupled to the default router determination engine 404 via a network or other connection while remaining within the scope of the present disclosure. The default router determination engine 404 is also coupled to a communication system 408 (e.g., via a coupling between the processing system and the communication system 408) that is housed in the chassis 302 and that may include a Network Interface Controller (NIC), a wireless communication device, and/or other communication components known in the art that enable the client device 400 to be coupled to access switch device (e.g., the access switch devices 210a-c in FIG. 2) and/or other network components known in the art. While a specific client device 400 has been illustrated, one of skill in the art in possession of the present disclosure will recognize that other client devices and/or computing equipment may benefit from the teachings of the present disclosure, and thus the application of those teachings to such systems will fall within the scope of the present disclosure.

Figure 5A:
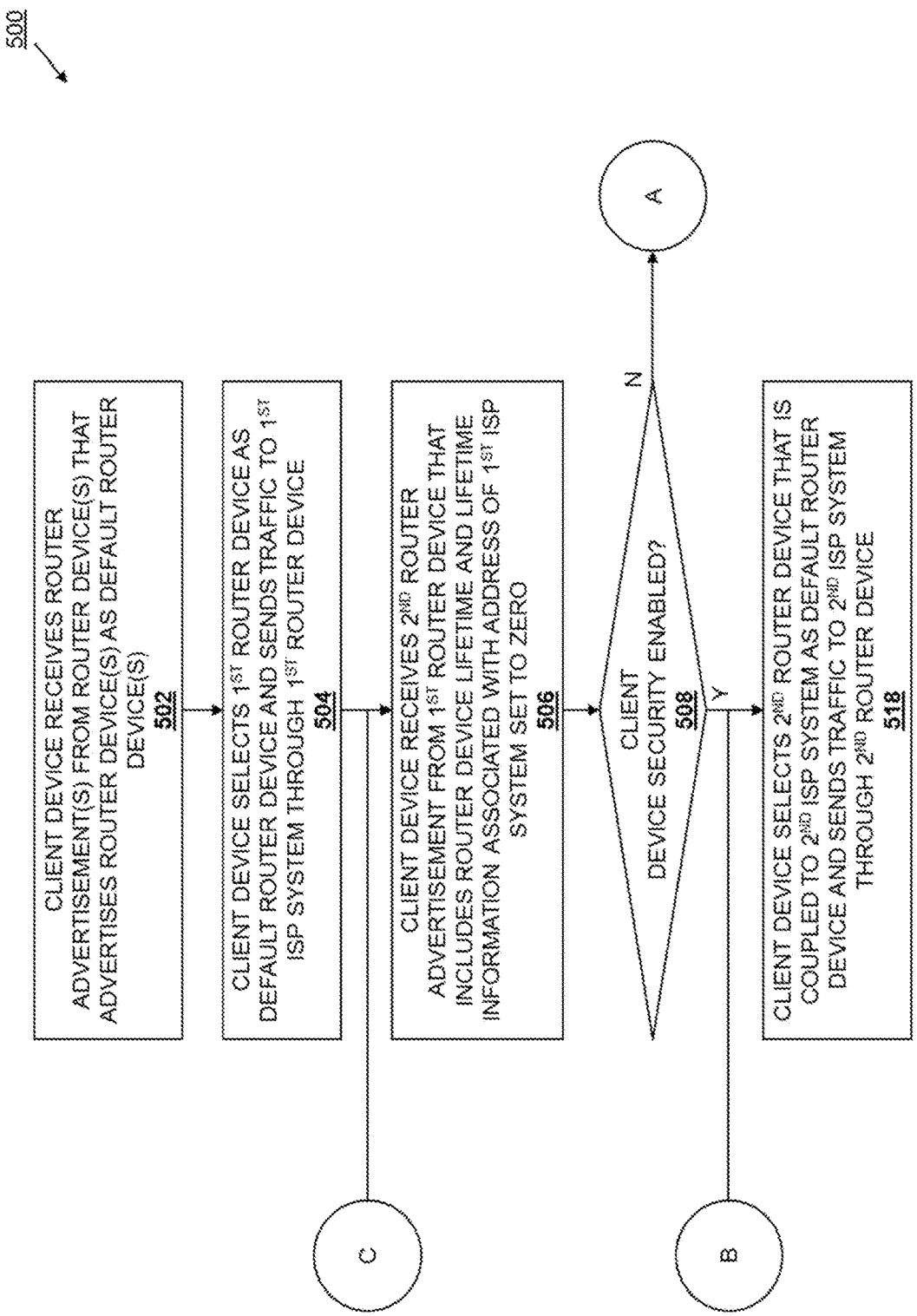
FIG. 5A is a flow chart illustrating an embodiment of a portion of a method for Internet service provider switchover in a multi-homing system.

Referring now to FIGS. 5A and 5B, an embodiment of a method 500 for ISP switchover in a multi-homing system is illustrated. As discussed above, in some multi-homing systems such as, for example, IPv6 multi-homing systems, conventional client devices may select default router devices through which to send traffic to ISP systems in response to received conventional router advertisements, and when the link(s) between the default router device and the ISP system become unavailable, the client devices may not be able to switch traffic to other router device(s) that have available link. This is due to IPv6 router advertisement standards that cause the default router device (which is connected to the Internet service provider by the unavailable link) to continue to send router advertisements that declare itself as the default router device (along with the address prefix for Internet service provider), which causes the client devices to continue to refresh their default router lifetime information and Internet service provider address lifetime information. The systems and methods of the present disclosure operate to remedy these situations (which result in dropped traffic) by having the default router device detect the unavailable link to its ISP system, send out a router advertisement with router lifetime information associated with the default router device and lifetime information associated with the address of that ISP system set to zero, and have the client devices select a new default router device through which to send traffic to an available ISP system via an available link, as well as remove address information associated with the unavailable ISP system such that traffic is sent to the available ISP system. Furthermore, systems and methods are provided to ensure that client devices without security subsystems enabled may perform such switchovers while ensuring that the switchover is not in response to malicious router advertisements.

In the specific embodiments discussed below, such benefits are enabled via a new router advertisement prefix option that is defined as a "remaining lifetime" and provided in addition to the conventional valid lifetime and preferred lifetime that are provided in the prefix options of conventional router advertisements, as well as new Neighbor Discovery Protocol (NDP) messages that are defined as an "address confirmation request message" and an "address confirmation reply message". As discussed below, client devices may be configured to respond to a router advertisement that includes a router lifetime set to zero, a remaining lifetime set to zero, and/or an address (or address prefix) of an ISP system, by either immediately selecting a new router device as its default router device and/or removing the address of the unavailable ISP system from its valid address list if it has security enabled, or sending an address confirmation request message, selecting a new router device as its default router device, and/or removing the address of the unavailable ISP system from its valid address list if an address confirmation reply message is not received in some time period if it does not have security enabled. In the example provided below, communications between the router device 206a and two of the client devices 210a and 212b in the embodiment of the multi-homing ISP switchover system 200 of FIG. 2 are illustrated and described. However, one of skill in the art in possession of the present disclosure will recognize that any number of router devices and client devices may communicate in the manner described below while remaining within the scope of the present disclosure.

Figure 6:
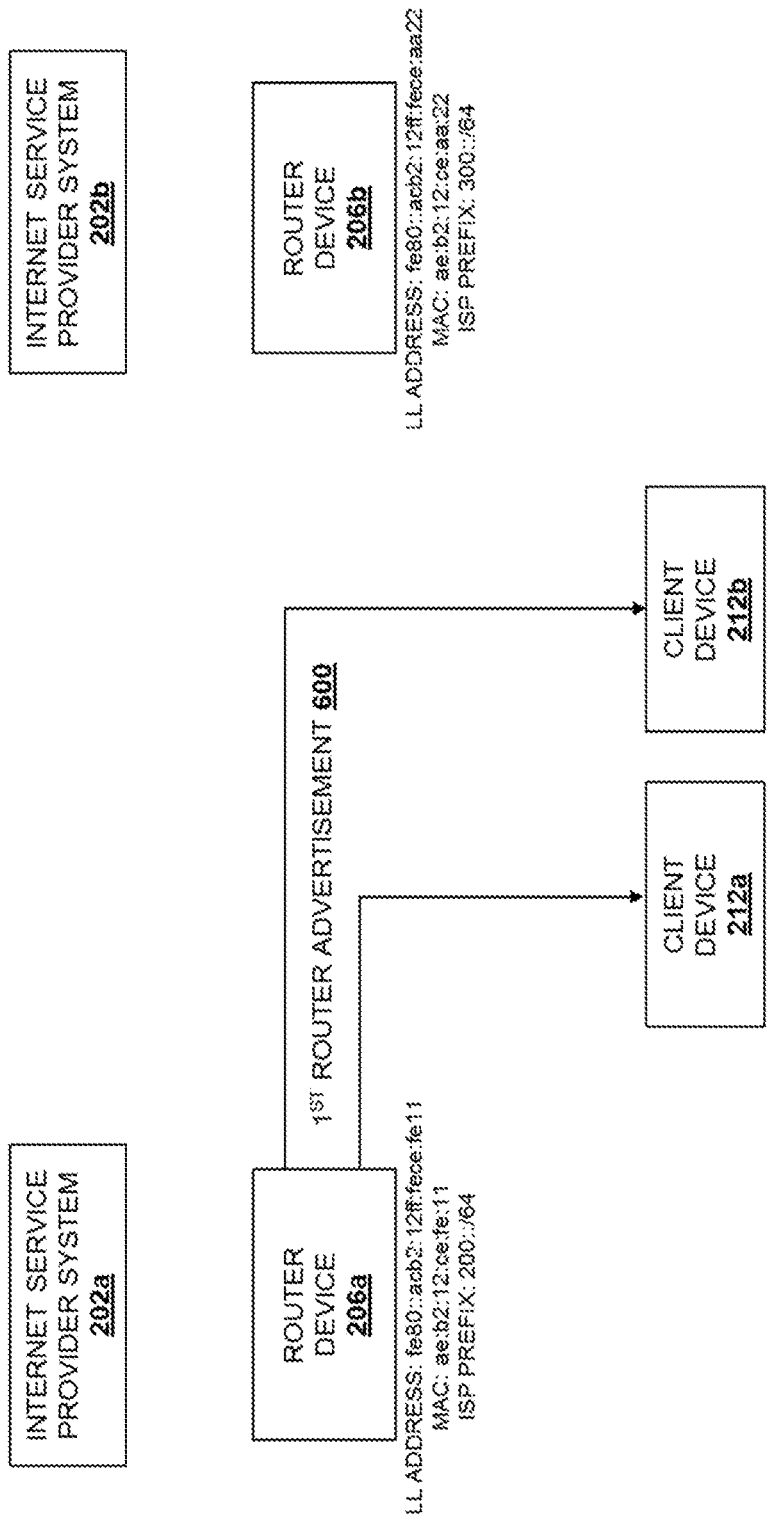
FIG. 6 is a communication diagram illustrating first router advertisements in the multi-homing Internet service provider switchover system of FIG. 2 during the method of FIG. 5.

The method 500 begins at block 502 where a client device receives router advertisement(s) from a router device(s) that advertise the router device(s) as a default router device(s). Referring now to FIG. 6, an embodiment of the router device 206a sending a first router advertisement 600 to each of the client devices 210a and 212b is illustrated, and one of skill in the art in possession of the present disclosure will recognize that the first router advertisement 600 may be sent to any other client devices (e.g., the client device 212c illustrated in FIG. 2) included in the datacenter 214. In an embodiment, the ISP system 202a may advertise a default route (e.g., [::/0] or any specific route (e.g., [x::/y]) using a variety of dynamic routing protocols known in the art, and upon receiving that default route or specific route, the router advertisement engine 304 in the client device 400 may then advertise itself as a default router device subject to the received route being present or active in router device database(s) 306 (e.g., in a routing table). As discussed below, the client devices 210a and 212b (and any other client device in the datacenter 214) may receive router advertisements from any of the router devices in the datacenter 214 and select one of those router devices as a default router device using router device selection methods (e.g., round robin) when an ISP is available through that router device. In the specific examples discussed below, the router device 206a is selected by the client devices 210a and 212b in response to receiving the first router advertisement 600.

In an embodiment, the router advertisement engine 304 in the router device 206a/300 may utilize information in the router device database(s) 306 to send the first router advertisement 600 through the communication system 308 and to the client devices 210a and 212b that may include conventional router advertisement information such as, for example, a router lifetime, a preferred lifetime, and a valid lifetime that are valid and set to some non-zero time period (e.g., 2 hours or some other time period defined by a network administrator or selected by default), as well as a link local address of the router device 206a (e.g., fe80::acb2:12ff:fece:fe11 in the illustrated embodiment) as the source address, an ISP prefix for the ISP system 202a (e.g., 200::/64 in the illustrated embodiment), and/or other router advertisement information known in the art, in order to advertise itself as a default router device. As would be understood by one of skill in the art in possession of the present disclosure, in FIG. 6 the router device 206b (e.g., a "second router device") may send out router advertisements that include conventional router advertisement information as well, such as, for example, a router lifetime, a preferred lifetime, and a valid lifetime that are valid and set to some non-zero time period (e.g., 2 hours or some other time period defined by a network administrator or selected by default), as well as a link local address of the router device 206b (e.g., fe80::acb2:12ff:fece:aa22 in the illustrated embodiment) as the source address, an ISP prefix for the ISP system 202b (e.g., 300::/64 in the illustrated embodiment), and/or other router advertisement information known in the art, in order to advertise itself as a default router device.

Figure 7:
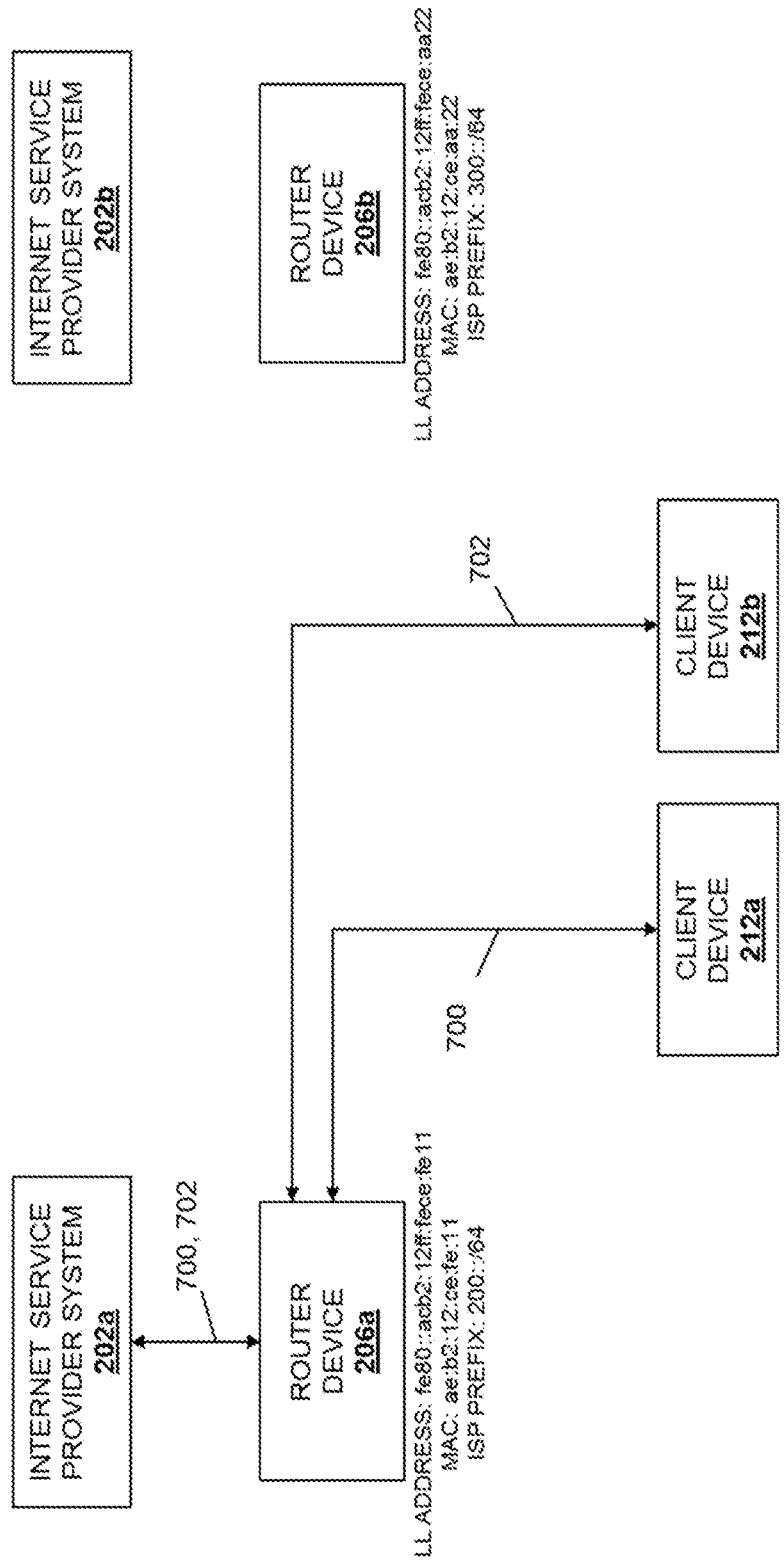
FIG. 7 is a communication diagram illustrating traffic via first traffic paths in the multi-homing Internet service provider switchover system of FIG. 2 during the method of FIG. 5.

The method 500 then proceeds to block 504 where the client device selects the first router device as a default router device and sends traffic to a first ISP system through the first router device. Referring now to FIG. 7, the default router determination engine 404 in the client devices 210a/400 and 212b/400 may receive the first router advertisement 600 from the router device 206a and, in response, may select the router device 206a as a default router device through which to send traffic to the network 204 via the ISP system 202a. The selection of the router device 206a as the default router device may be based upon a round robin protocol and/or any other default router device selection criteria known in the art. Following the selection of the router device 206a as their default router device, each of the client devices may send and receive respective traffic 700 and 702 to and from the ISP system 202a through the router device 206a (e.g., via the access switch devices and switch devices discussed above with reference to FIG. 2, and using information about the traffic being sent as well as any information stored in the client device database 406).

The method 500 then proceeds to block 506 where the client device receives a second router advertisement from the first router device that includes router lifetime information associated with the default router device set to zero, and lifetime information associated with an address of the first ISP system set to zero. In an embodiment, the router devices 202a and 202b may be configured to advertise themselves as default router devices by setting their router lifetime to some non-zero number, as well as advertise themselves as non-default routers by setting their router lifetime to zero. In addition, the router devices 202a and 202b may be configured to advertise themselves as default router devices only when a specific route (e.g., x::/y as defined by a network administrator) is present or active, and advertise itself as a non-default router when that specific route is not present or inactive. For example, the router device 206a may be configured to advertise itself as a default router device when a route to the prefix for the ISP system 202a (e.g., 200::/64 in the illustrated embodiment, or default routes (::/0)) is available, and advertise itself as a non-default router when the route to the prefix for the ISP system 202a is not available. Similarly, the router device 206b may be configured to advertise itself as a default router when a route to the prefix for the ISP system 202a (e.g., 300::/64 in the illustrated embodiment) is available, and advertise itself as a non-default router when the route to the prefix for the ISP system 202b is not available.

Figure 8:
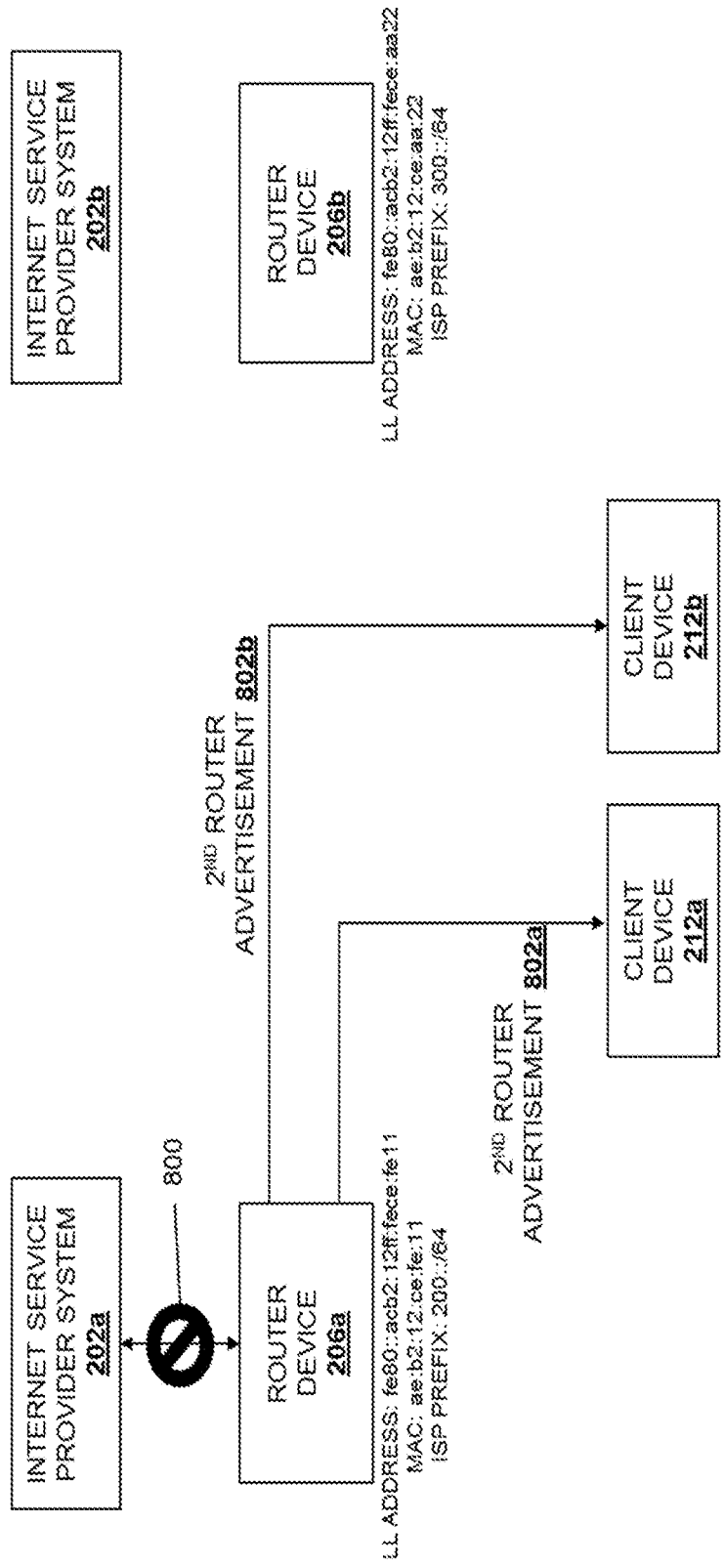
FIG. 8 is a communication diagram illustrating a down link in the multi-homing Internet service provider switchover system of FIG. 2 during the method of FIG. 5 that results in second router advertisements.

Referring now to FIG. 8, an embodiment is illustrated of an unavailable link 800 between the router device 206a and the ISP system 202a. In the illustrated embodiment, the link(s) between the router device 206a may "go down", be subject to a reduced bandwidth that greatly limits the amount of traffic that may be sent by the router device 206a to the ISP system 202a, and/or may otherwise become unavailable such that the ISP system 202a is not reachable (or cannot receive a minimum amount of traffic that client devices are providing to the router device 206a for forwarding through the network 204) by the router device 206a. However, in other embodiments, rather than an unavailable link, the ISP system 202a itself may become unavailable for any of a variety of reasons that would be apparent to one of skill in the art in possession of the present disclosure. In an embodiment, at block 506, the router advertisement engine 304 in the router device 206a/300 may detect the unavailable link 800 using information in the router device database(s) 306. For example, when a link between a router device and ISP system goes down, the router advertisement engine 304 in the router device 206a/300 may determine that it has not received a dynamic routing update from the ISP system 202a within some time period and, in response, remove or mark as inactive the route and, in response, with the default router functionality of the router device 206a as well as the address associated with the prefix for that ISP system (e.g., 200::/64 in the illustrated embodiment) from the router device database(s) 306, and the prefix for that ISP system may be stored in the router device database(s) 306 as an invalid prefix.

In response to detecting the unavailable link 800, the router advertisement engine 304 in the router device 206a/300 may utilize information in the router device database(s) 306 to send second router advertisements 802a and 802b through the communication system 308 and to the client devices 210a and 212b. The second router advertisements 802a and 802b may include, for example, the link local address of the router device 206a (e.g., fe80::acb2:12ff:fece:fe11 in the illustrated embodiment) as the source address, the ISP prefix for the ISP system 202a (e.g., 200::/64 in the illustrated embodiment), as well as a as well as any other router advertisement information known in the art. In addition, the router advertisement engine 304 in the router device 206a/300 may set router lifetime information in the second router advertisements 802a and 802b to zero, and set the preferred lifetime and valid lifetime associated with the address of the ISP system 202a to zero. For example, the router advertisement engine 304 in the router device 206a/300 may set the router lifetime, the preferred lifetime, and the valid lifetime in the second router advertisements 802a and 802b to zero. Furthermore, the second router advertisements 802a and 802b may include a remaining lifetime of the address of the ISP system 202a (e.g., the prefix 200::/64 in this embodiment) that the router advertisement engine 304 in the router device 206a/300 sets to zero as well. Each of the preferred, valid, and remaining lifetime may be associated with the address of the ISP system 202a (e.g., 200::/64 in this embodiment) by providing the prefix for that address in the second router advertisements 802a and 802b. The default router determination engine 404 in each of the client devices 210a/300 and 212b/400 (as well as any other client devices in the datacenter 214) may receive the second router advertisements through the communication system 408 at block 506.

Figure 9:
FIG. 9 is a schematic view illustrating an embodiment of a router advertisement used in the communications of FIG. 8.

Referring now to FIG. 9, an embodiment of a router advertisement 900 that may be second router advertisements 802a and 802b sent by the router device 206a discussed above with reference to FIG. 8 is illustrated. As can be seen the router advertisement 900 includes a plurality of fields such as a router lifetime field 901, a valid lifetime field 902, a preferred lifetime field 904, a remaining lifetime field 906, and a prefix field 908. In addition, one of skill in the art in possession of the present disclosure will recognize that the router advertisement may include the type, code, checksum, current hop limit, M|O, reachable time, retransmittal time, length, prefix length, reserved, and other router advertisement fields that are not provided with element numbers in FIG. 9. As discussed above, lifetime information in the router advertisement 900 may be set to zero by setting the router lifetime field 901, the valid lifetime field 902, the preferred lifetime field 904, and the remaining lifetime field 906 to zero, and the lifetime information that is set to zero may be associated with an address of an ISP system by providing a prefix for the address of the ISP system (e.g., the ISP system 202a in FIGS. 2, 6, 7, and 8) in the prefix field 908. While a specific embodiment of a router advertisement is illustrated, one of skill in the art in possession of the present disclosure will recognize that modifications to the router advertisement 900 will fall within the scope of the present disclosure.

The method 500 then proceeds to decision block 508 where the client devices determine whether they have security enabled. In some embodiments, the client devices 210a and/or 212b may be configured with security such as, for example, according to the Secure Neighbor Discovery (SEND) protocol. As discussed below, with security enabled in a client device, that client device may immediately switchover their traffic to a different router device in response to receiving the second router advertisement with the lifetime information set to zero as discussed above. However, if security is not enabled in a client device, that client device may need to confirm that the ISP system is unavailable before switchover of traffic in order to, for example, prevent the receipt of malicious router advertisements from resulting in a traffic switchover when an ISP system is available. If, at decision block 508, the default router determination engine 404 in the client device 210a/400 or 212b/400 determines it has security enabled, the method 500 may proceed immediately to block 518 where the client device selects a second router device that is coupled to a second ISP system as its default router device (as well as removes the address information for the unavailable ISP system from its databases to prevent the use of that address information with existing traffic flows that could cause those traffic flows to be dropped due to source address filtering by the available ISP system) and sends traffic to the second ISP system through the second router device (e.g., by providing address information for the available ISP system as a source address for that traffic), discussed in further detail below. If, at decision block 508, the default router determination engine 404 in the client device 210a/400 or 212b/400 determines it does not have security enabled, the method 500 may proceed to decision block 510 where the client device determines whether it has received an address confirmation request message.

In an embodiment of decision block 510, the default router determination engine 404 in the client device 210a/400 or 212b/400 determines whether it has received an address confirmation request message. In an embodiment, upon receiving the second router advertisements 802a and 802b from the first router device 206a that include the router lifetime information set to zero, and lifetime information associated with the address of the ISP system 202a set to zero, the default router determination engine 404 in the client device 210a/400 and 212b/400 may monitor a timer for some time period to determine whether an address confirmation request message is received. For example, upon receiving the second router advertisements 802a and 802b from the first router device 206a that include the router lifetime information set to zero, and the remaining lifetime information associated with the address of the ISP system 202a set to zero, the default router determination engine 404 in the client device 210a/400 and 212b/400 may start a timer that is set to a random time period (e.g., between 0-1 seconds), monitor that timer, and determine whether an address confirmation request message is received during the time period. If, at decision block 510, it is determined that the client device has not received an address confirmation request message, the method 500 proceeds to block 512 where that client device sends an address confirmation request message that includes the address of the first ISP system (e.g., the prefix 200::/64 in this embodiment). If, at decision block 510, it is determined that the client device has received an address confirmation request message, the method 500 proceeds to decision block 514 where that client device determines whether an address confirmation reply message has been received. In an embodiment, the router determination engine 404 in a client device 400 that has received an address confirmation request message from another client device may set an address confirmation reply timer, discussed in further detail below, in response to receiving that address confirmation request message. One of skill in the art in possession of the present disclosure will recognize that block 510 prevents the flooding of the network with the address confirmation request messages discussed below by ensuring that only one (or only a few) client devices will send address confirmation request message (e.g., due to the sending of the address confirmation request message based on a randomly selected time period, and not sending the address confirmation request message if an address confirmation request message is received during that randomly selected time period that includes the same prefix.)

Figure 10:
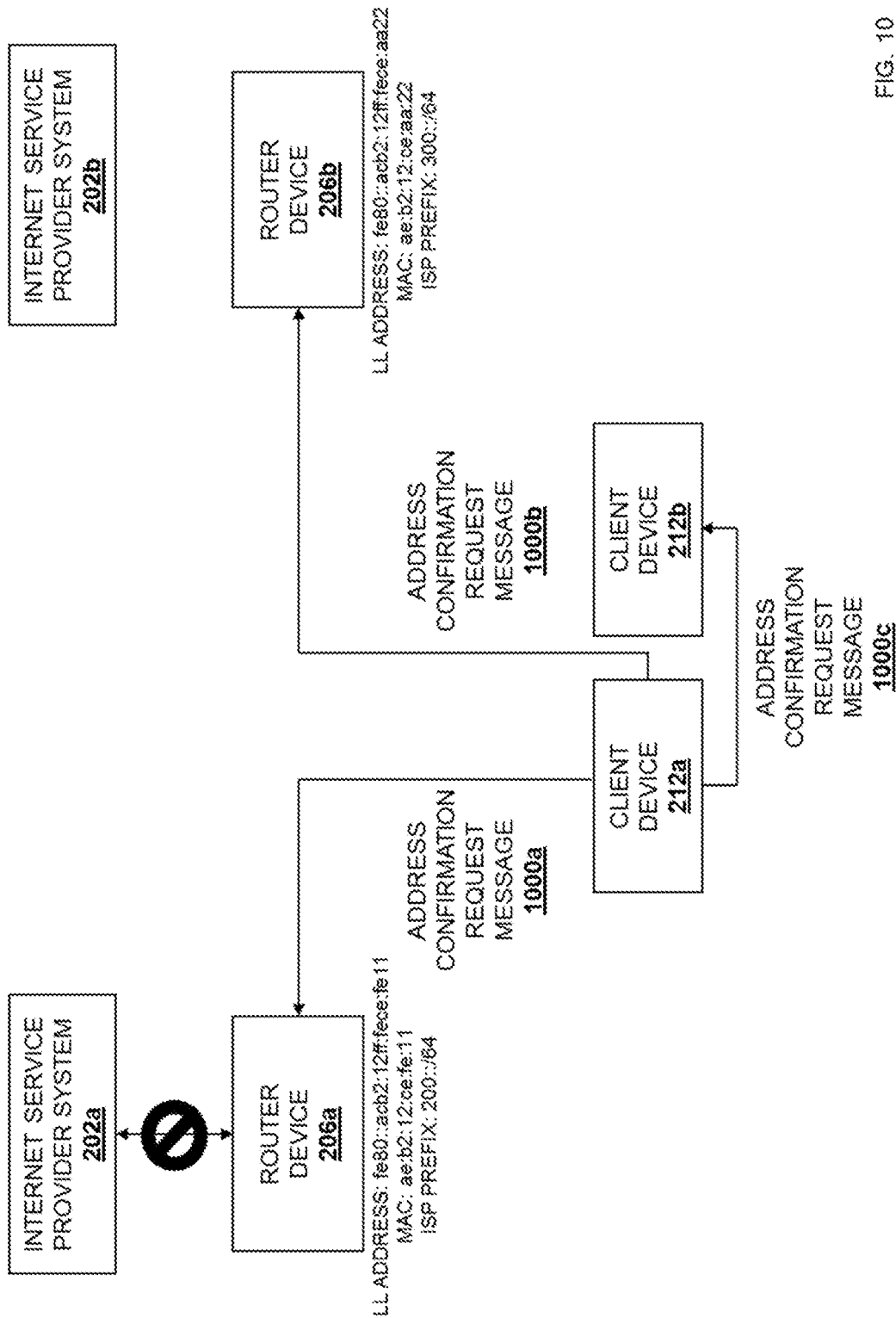
FIG. 10 is a communication diagram illustrating address confirmation request messages in the multi-homing Internet service provider switchover system of FIG. 2 during the method of FIG. 5.

In an embodiment, the method 500 proceeds to block 512 in response to the default router determination engine 404 in the client device 210a/400 determining that it has not received an address confirmation request message (e.g., during some time period). Referring now to FIG. 10, in an embodiment of block 512, the router determination engine 404 in that client device 212a/400 then sends address confirmation request messages 1000a, 1000b, and 1000c throughout the datacenter 214 that include the prefix of the ISP system 202a (e.g., 200::/64 in this embodiment). In an embodiment, the router determination engine 404 in that client device 210a/400 may also set an address confirmation reply timer, discussed in further detail below, in response to sending the address confirmation request messages 1000a-c. As discussed above, the receipt of the address confirmation request message 1000c by the client device 212b before some time period after receiving the second router advertisement 802 from the router device 206a will cause the router determination engine 404 in that client device 212b/400 to not send out an address confirmation request message (similar to the address confirmation request messages 1000a-c) in order to, for example, prevent the flooding of the network with address confirmation request messages from each of the client devices in the datacenter 214 that receive the second router advertisement 802.

Referring now to FIG. 11, an embodiment of an address confirmation request message 1100 is illustrated that may be sent by a client device at block 512. In the illustrated embodiment, the address confirmation request message 1100 includes a type field 1102 and a target prefix field 1104. In addition, one of skill in the art in possession of the present disclosure will recognize that the address confirmation request message may include the code, checksum, target prefix length, and router lifetime fields that are not provided with element numbers in FIG. 11. Type information may be provided in the type field 1102 that provides some newly defined value (e.g., reserved in the Internet Control Message Protocol (ICMP)) for the address confirmation request message 1100. In addition, address information for the address of the ISP system that was received in the router advertisement 802 from the router device 206a (e.g., the prefix 200::/64 in this embodiment) may be provided in the target prefix field 1104. While a specific embodiment of an address confirmation request message is illustrated, one of skill in the art in possession of the present disclosure will recognize that modifications to the address confirmation request message 1100 will fall within the scope of the present disclosure.

In an embodiment, the address confirmation request messages discussed above may be generated by a client device in response to receiving a router advertisement with the router lifetime set to zero or less than the current remaining router lifetime stored on the client device for a particular default router device. In such embodiments, the client device may receive the router advertisement with a target prefix of the associated ISP system, the source link local address of the router device, a prefix length of 128, and the router lifetime and, if that router lifetime is greater than the router lifetime currently included in the client device, the client device ignores the router advertisement, while if that router lifetime is zero or less than the router lifetime currently included in the client device, the client device may operate to send the address confirmation request message as discussed above.

Figure 12:
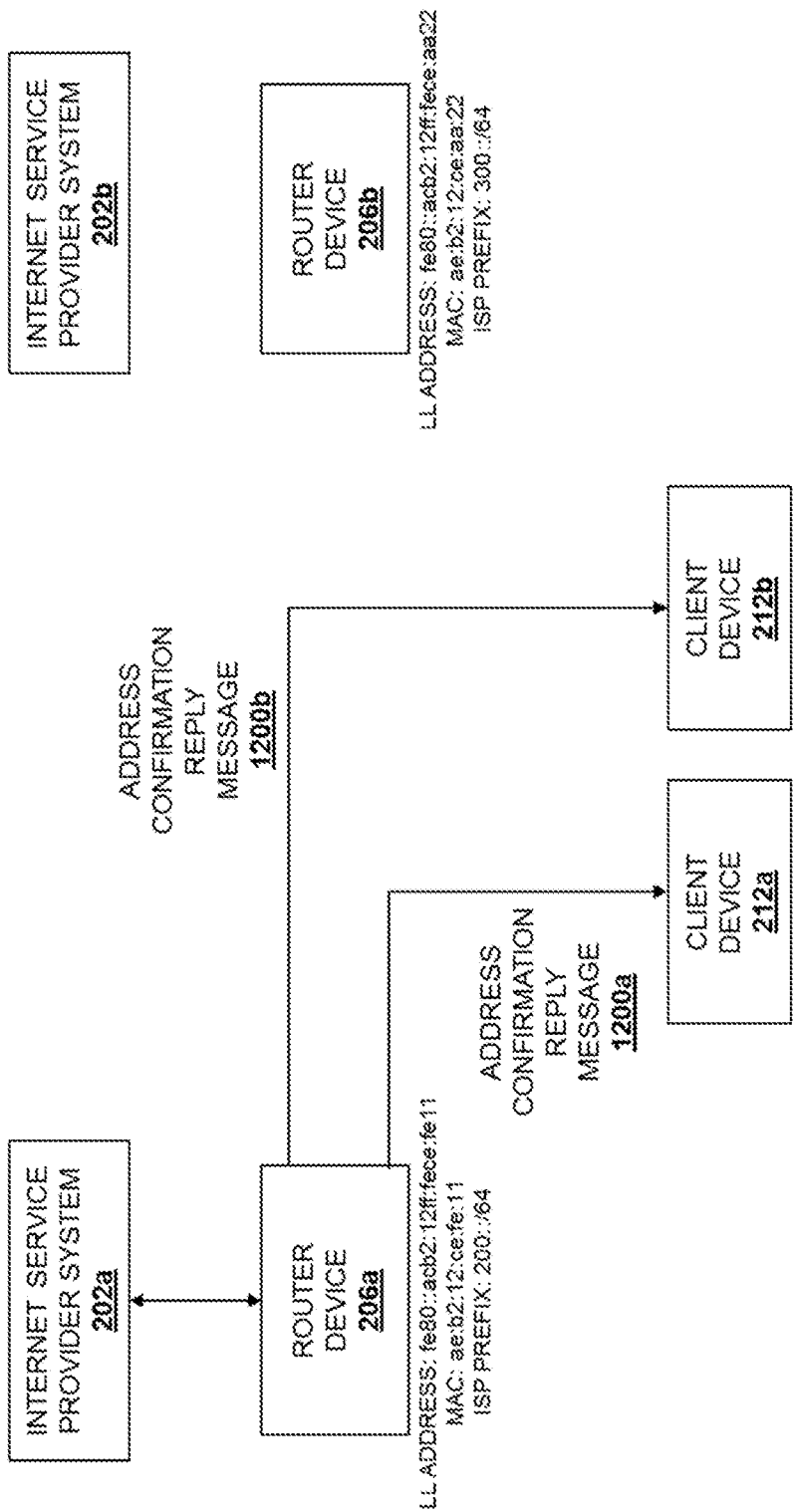
FIG. 12 is a communication diagram illustrating address confirmation reply messages in the multi-homing Internet service provider switchover system of FIG. 2 during the method of FIG. 5.

Following the sending of the address confirmation request message at block 512 (e.g., by the client device 206a as discussed above), or in response to the determination at decision block 510 that an address confirmation request message has been received (e.g., by the client device 206b as discussed above), the method 500 proceeds to decision block 514 where the client device determines whether an address confirmation reply message has been received. In an embodiment, at decision block 514, the default router determination engine 404 in the client devices 210a/300 and 212b determines whether an address confirmation reply message has been received through the communication system 408. In an embodiment, upon receiving the address confirmation request message 1000a from the client device 212b through its communication system 308, the router advertisement engine 304 in the router device 300 references the address of the ISP system included in the address confirmation request message 1000a (e.g., the prefix information in the target prefix field 1104 discussed above with reference to FIG. 11) and determines whether that address information matches an invalid address information in the router device database(s) 306. For example, as discussed above, if a dynamic routing update from the ISP system 202a is not received within some time period, the default route associated with the prefix for that ISP system (e.g., 200::/64 in the illustrated embodiment) may be withdrawn by the router advertisement engine 304 in the router device 300 such that the prefix for that ISP system is stored in the router device database(s) 306 as an invalid prefix. At decision block 514, the router advertisement engine 304 in the router device 300 may determine whether the prefix information in the target prefix field 1104 of the received address confirmation request message 1000a matches an invalid prefix in the router device database(s) 306. With reference to FIG. 12, if the address information in the address confirmation request message 1000a does not match an invalid address information in the router device database(s) 306, the router advertisement engine 304 in the router device 300 will send out address confirmation reply messages 1200a and 1200b to the client devices 210a and 212b (as well as other client devices in the datacenter 214). If the address information in the address confirmation request message 1000a matches an invalid address information in the router device database(s) 306, the router advertisement engine 304 in the router device 300 will not send out an address confirmation reply message. In an embodiment, a target prefix of the ISP system in the address confirmation request message may correspond to the link local address of the router device and may cause the router device to check its current effective router lifetime (which will be zero if the ISP system is unavailable) and, if that value is not equal to the router lifetime in the address confirmation request message, the router device may send an address confirmation reply message.

Figure 13:
FIG. 13 is a schematic view illustrating an embodiment of an address confirmation reply message used in the communications of FIG. 12.
Figure 14:
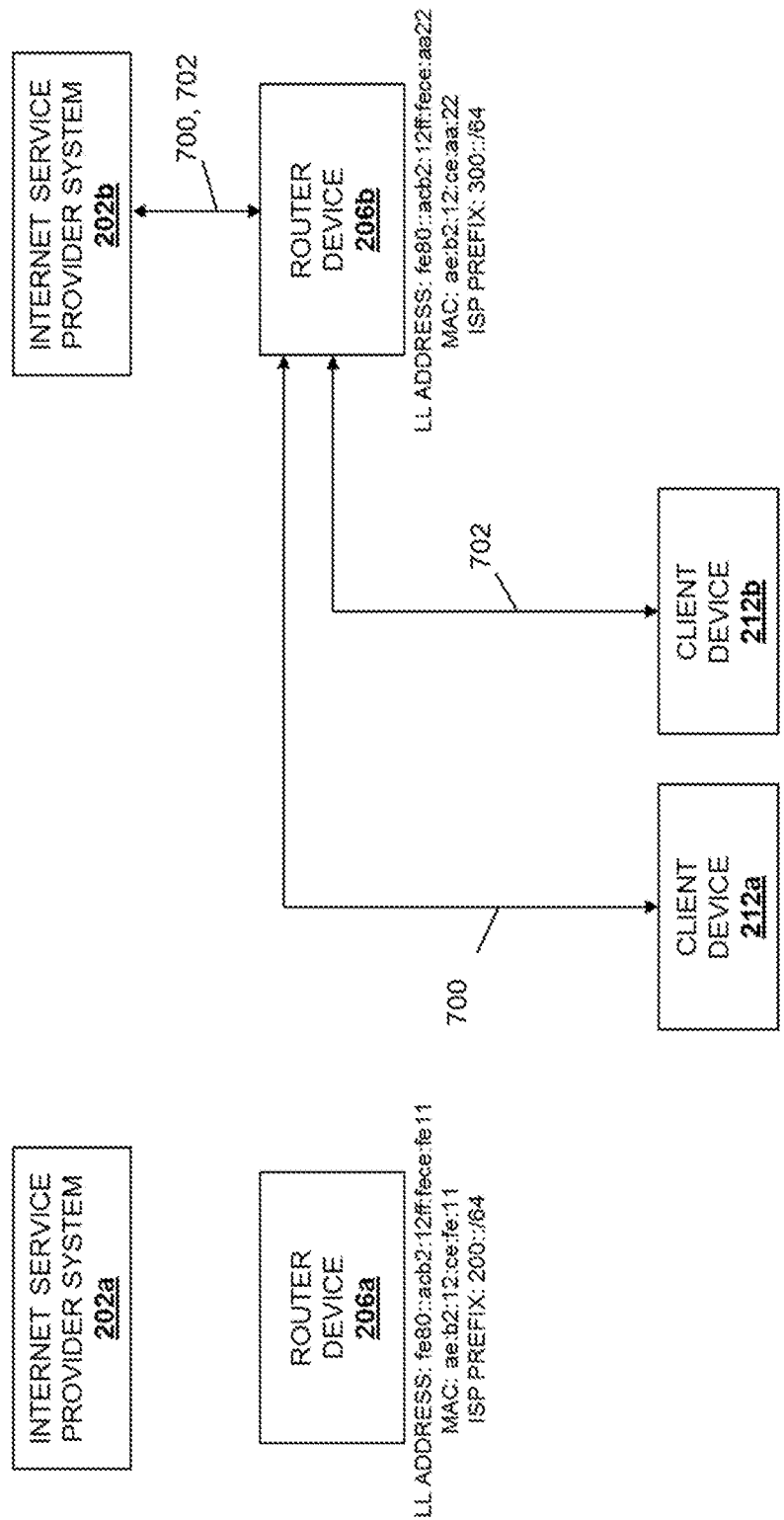
FIG. 14 is a communication diagram illustrating traffic via second traffic paths in the multi-homing Internet service provider switchover system of FIG. 2 during the method of FIG. 5.

Referring now to FIG. 13, an embodiment of an address confirmation reply message 1300 is illustrated that may be sent by a router device at decision block 514. In the illustrated embodiment, the address confirmation reply message 1300 includes a type field 1302 and a target prefix field 1304. In addition, one of skill in the art in possession of the present disclosure will recognize that the address confirmation request message may include the code, checksum, target prefix length fields that are not provided with element numbers in FIG. 13. Type information may be provided in the type field 1302 that provides some newly defined value (e.g., reserved in the Internet Control Message Protocol (ICMP)) for the address confirmation reply message 1300.

In addition, address information for the address of the ISP system that was determined to be valid by the router device (e.g., the prefix 200::/64 in this embodiment) may be provided in the target prefix field 1304. While a specific embodiment of an address confirmation reply message is illustrated, one of skill in the art in possession of the present disclosure will recognize that modifications to the address confirmation reply message 1300 will fall within the scope of the present disclosure.

In an embodiment of decision block 514, the router determination engine 404 in the client device 210a/400 and the client device 202a/300 determines whether an address confirmation request message has been received within a time period (e.g., 3 seconds) that may be determined by the address confirmation reply timer discussed above. If the client device receives the address confirmation reply message at decision block 514 (e.g., within some time period), the method 500 proceeds to block 516 where the client device sends traffic to the first ISP system through the first router device. In an embodiment, if the router determination engine 404 in the client device 210a/400 and the client device 212b/400 receive the respective address confirmation reply message 1200a and 1200b and determine that they include the prefix for the ISP system 202a (e.g., 200::/64 in this embodiment), and the method 500 proceeds to block 516 where router determination engine 404 in the client device 210a/400 and the client device 212b/400 continues to send their respective traffic 700, 702 to the ISP system 202a through the router device 206a, as illustrated in FIG. 7. Thus, decision block 510, block 512, decision block 514, and block 516 may be performed by the client devices 210a and 212b to check whether the ISP system 202a is available through the router device 206a in response to receiving an router advertisement that has set the lifetime information associated with the address of that ISP system 202a to zero, which ensures that malicious router advertisements will not cause the switching of traffic to a different ISP system (as the router device 206a will respond with an address confirmation reply message and prevent the switchover). The method 500 will then proceed back to block 506 and operate as discussed above if the client devices 210a and 212b receive a router advertisement similar to the second router advertisement discussed above.

If the client device receives the address confirmation request message at decision block 514 (e.g., within some time period), or following the determination at decision block 508 that security is enabled in the client device, the method 500 proceeds to block 518 where the client device selects a second router device that is coupled to a second ISP system as its default router device and send traffic to the second ISP system through the second router device. In an embodiment, the router determination engine 404 in the client device 210a/400 and the client device 212b/400 select the second router device 206b as their default router devices and send their respective traffic 700, 702 to the ISP system 202b through the router device 206b. Thus, in response to receiving an router advertisement that has set the lifetime information associated with the address of the ISP system 202a to zero, the client devices 212a and 212b will select a new default router device and being sending all of their traffic to a new ISP system through that new default router device.

In an embodiment, upon receiving a router advertisement, the client devices may determine whether the source address in that router advertisement (e.g., the link local address of the router device sending the router advertisement) matches an entry in a default router device in the client device database 406 and, if so, that client device may start the timer and send the address confirmation request message as discussed above. In some embodiments, client devices may be configured to disable the sending and/or receiving of address confirmation request messages and address confirmation reply messages if the number of such messages that are sent for the same ISP system prefix exceeds a threshold in some time period, and that ISP system prefix may be determined to be invalid in such situations that may arise due to a malicious attack on the datacenter 214. Furthermore, the client device will ignore address confirmation request messages and address confirmation reply messages if no address confirmation request timer or address confirmation reply timer has been started.

One of skill in the art in possession of the present disclosure will recognize that the second router advertisement 802 that advertises the router device 206a as a non-default router device by setting the router lifetime of the router device, and the preferred and valid lifetime associated with the address of the ISP system 202a, to zero will cause the client devices to select a new default router device for any new traffic flows generated or otherwise provided through that client device following the receipt of that second router advertisement 802. Additionally, the available ISP system may be selected by the client device based on a policy defined in the client device and/or using multi-homing source address selection techniques known in the art.

However, existing traffic flows that are transmitted before receiving a router advertisement from a default router device that includes preferred and valid lifetime associated with the address of its respective ISP system set to zero will continue to use the previous source address of the unavailable ISP system due to standards (e.g., RFC 4862) that protect from malicious router advertisements by setting the valid lifetime of the default router device to an extended time period (e.g., 2 hours) that delays existing traffic switchover actions to 2 hours subsequent to the router advertisement that sets the preferred and valid lifetimes to zero. Use of that previous source address with the newly selected default router device may cause traffic drops in the available ISP system if subjected to source address filtering due to the previous source address of the unavailable ISP system being used with the traffic being different than the address being provided by the available ISP system. The changing of a source address for the traffic is subject to that source address being determined to be invalid, and RFC 4862 sets the address valid lifetime to 2 hours upon receiving a valid lifetime set to zero, and thus the previous source address of the unavailable ISP system will still be valid for 2 hours upon receiving the router advertisement. However, the systems and methods of the present disclosure remedy this issue by allowing the client devices to switchover new and existing traffic flows to a newly selected default router device and declare the previous source address of the unavailable ISP system as invalid immediately following the receipt of a router advertisement from a default router device that includes the router lifetime set to zero, and the preferred, valid, and remaining lifetimes for the address of its respective ISP system set to zero, all while protecting against malicious router advertisements as discussed above.

Thus, systems and methods have been described that provide for default router devices to detect unavailable links to their ISP systems and send out router advertisements with router lifetime information for the router device and lifetime information associated with the address prefix of their unavailable ISP systems set to zero. The client devices will then select a new default router device through which to send traffic to its respective available ISP system. Furthermore, client devices without security enabled will perform such switchovers only after ensuring that the switchover is not in response to malicious router advertisements by soliciting a confirmation from the default router device in a manner that doesn't flood the network with traffic. As such, multi-homed networks are provided with redundant ISP systems and may quickly switchover to the redundant ISP system in the event an ISP system that is currently being used become available, which reduces the loss of traffic due to the unavailability of an ISP system to a multi-homed network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-homing Internet service provider switchover system, comprising:
   a plurality of Internet service provider systems;
   a plurality of router devices, wherein a respective router device of the plurality of router devices is coupled to each of the plurality of Internet service provider systems, and wherein each of the plurality of router devices is configured to:
      determine that a route to its respective Internet service provider system is unavailable and, in response, advertise as a non-default router device with router lifetime information and lifetime information associated with an address of its respective Internet service provider system set to zero; and
   a client device coupled to the plurality of router devices, wherein the client device is configured to:
      receive a router advertisement from a first router device of the plurality of router devices that is selected as a default router device and that is coupled to a first Internet service provider of the plurality of Internet service providers; and
      determine that the router advertisement includes router lifetime information and lifetime information that is associated with the address of the first Internet service provider system set to zero and, in response, select a second router device of the plurality of router devices that is different than the first router device as the default router device such that traffic that is being sent to the first Internet service provider system through the first router device is sent to a second Internet service provider system through the second router device.

2. The system of claim 1, wherein each of the plurality of router devices is configured to:
   determine that a route to its respective Internet service provider system is available and, in response, advertise as a default router device.

3. The system of claim 1, wherein the lifetime information that is associated with the address of the first Internet service provider system includes a preferred lifetime, a valid lifetime, and a remaining lifetime.

4. The system of claim 1, wherein the client device is configured to determine that the lifetime information that is associated with the address of the first Internet service provider system is set to zero and, in response, send an address confirmation request message that includes the address of the first Internet service provider system.

5. The system of claim 4, wherein the client device is configured determine that no address confirmation reply message has been received within a time period following the sending of the address confirmation request message and, in response, select the second router device as the default router device such that traffic that is being sent to the first Internet service provider system through the first router device is sent to the second Internet service provider system through the second router device.

6. The system of claim 4, wherein the first router device is configured to receive the address confirmation request, determine whether the first Internet service provider system is available and, in response to determining that the first Internet service provider system is available, send an address confirmation reply message that indicates the address of the first Internet service provider system is valid.

7. An information handling system (IHS), comprising:
a communication system that is configured to couple to a plurality of router devices that are each coupled to a respective Internet service provider system;
a processing system that is coupled to the communication system; and
a memory system that is coupled to the processing system and that includes instructions that, when executed by the processing system, cause the processing system to provide a default router determination engine that is configured to:
send, through the communication system, traffic to a first Internet service provider system through to a first router device of the plurality of router devices that is selected as a default router device; and
receive, through the communication system from the first router device, a second router advertisement that includes router lifetime information and lifetime information associated with an address of the first Internet service provider system set to zero and, in response, select a second router device of the plurality of router devices that is different than the first router device as the default router device such that the traffic is sent to a second Internet service provider system through the second router device.

8. The IHS of claim 7, wherein the default router determination engine is configured to:
receive, through the communication system from the first router device, a first router advertisement that is sent prior to the second router advertisement and that advertises the first router device as a default router device and, in response, select the first router device as the default router device and send the traffic to the first Internet service provider system through the first router device.

9. The IHS of claim 7, wherein the lifetime information associated with the address of the first Internet service provider system includes a preferred lifetime, a valid lifetime, and a remaining lifetime.

10. The IHS of claim 7, wherein the default router determination engine is configured to:
determine that the lifetime information associated with the address of the first Internet service provider system is set to zero and, in response, send an address confirmation request message that includes the address of the first Internet service provider system.

11. The IHS of claim 10, wherein the default router determination engine is configured to:
determine that no address confirmation reply message has been received within a time period following the sending of the address confirmation request message and, in response, select the second router device as the default router device such that traffic that is being sent to the first Internet service provider system through the first router device is sent to the second Internet service provider system through the second router device.

12. The IHS of claim 10, wherein the default router determination engine is configured to:
determine that the lifetime information associated with the address of the first Internet service provider system is set to zero and, in response, send the address confirmation request message that includes the address of the first Internet service provider system in response to determining that no other address confirmation request messages have been received within a time period.

13. The IHS of claim 7, wherein the default router determination engine is configured to:
determine that an address confirmation reply message that indicates the address of the first Internet service provider system is valid has been received within a time period following the sending of the address confirmation request message and, in response, continue to send the traffic to the first Internet service provider system through the first router device.

14. A method for Internet service provider switchover in a multi-homing system, comprising:
sending, by a client device, traffic to a first Internet service provider system through to a first router device that is selected as a default router device;
receiving, by the client device from the first router device, a second router advertisement that includes router lifetime information and lifetime information associated with an address of the first Internet service provider system set to zero; and
selecting, by the client device in response to receiving the second router advertisement that includes the router lifetime information and the lifetime information associated with the address of the first Internet service provider system set to zero, a second router device that is different than the first router device as the default router device such that the traffic is sent to a second Internet service provider system through the second router device.

15. The method of claim 14, further comprising:
receive, by the client device from the first router device, a first router advertisement that is sent prior to the second router advertisement and that advertises the first router device as a default router device and, in response, selecting the first router device as the default router device and sending the traffic to the first Internet service provider system through the first router device.

16. The method of claim 14, wherein the lifetime information associated with the address of the first Internet service provider system includes a preferred lifetime, a valid lifetime, and a remaining lifetime.

17. The method of claim 14, further comprising:
determining, by the client device, that the lifetime information associated with the address of the first Internet service provider system is set to zero and, in response, sending an address confirmation request message that includes the address of the first Internet service provider system.

18. The method of claim 17, further comprising:
determining, by the client device, that no address confirmation reply message has been received within a time period following the sending of the address confirmation request message and, in response, selecting the second router device as the default router device such that traffic that is being sent to the first Internet service provider system through the first router device is sent to the second Internet service provider system through the second router device.

19. The method of claim 17, further comprising:

determining, by the client device, that the lifetime information associated with the address of the first Internet service provider system is set to zero and, in response, sending the address confirmation request message that includes the address of the first Internet service provider system in response to determining that no other address confirmation request messages have been received within a time period.

20. The method of claim 14, further comprising:

determining, by the client device, that an address confirmation reply message that indicates the address of the first Internet service provider system is valid has been received within a time period following the sending of the address confirmation request message and, in response, continuing to send the traffic to the first Internet service provider system through the first router device.

* * * * *